United States Patent Office 3,361,635
Patented Jan. 2, 1968

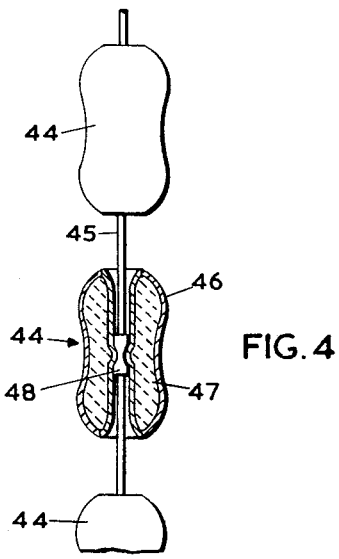
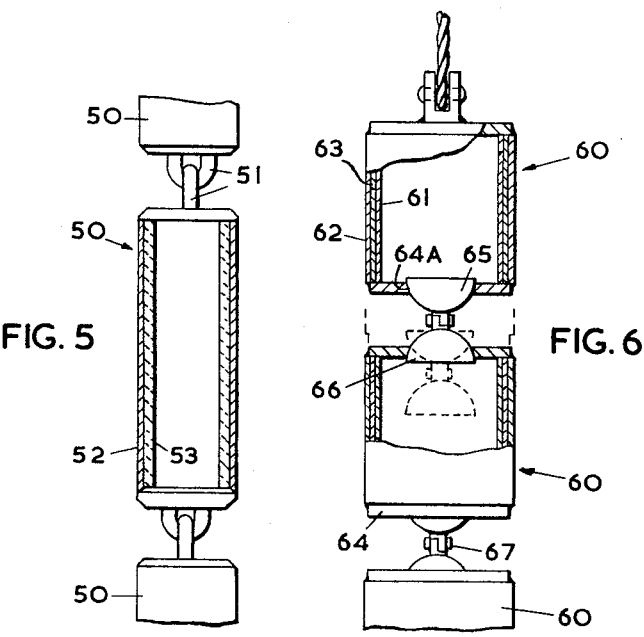

3,361,635
NUCLEAR REACTOR CONTROL ROD
WINDING ARRANGEMENTS
Everett Long, Whetstone, England, assignor to The English Electric Company Limited, London, England, a British company
Filed May 5, 1965, Ser. No. 453,444
Claims priority, application Great Britain, May 7, 1964, 19,124/64
3 Claims. (Cl. 176—36)

This invention relates to nuclear reactors of the kind comprising a closed pressure vessel the top face of which comprises a pile cap, a reactor core within said pressure vessel and having a plurality of control-element channels formed therein, drive means and winding means operated by the drive means for winding reactivity control elements into and out of the said control-element channels, and cables from each of which a said reactivity control element is suspended, the cables being themselves suspended from and wound up and down by the winding means.

Such reactors are known in which there are a number of these winding means, each mounted with its own separate drive means at or above the level of the pile cap but to one side thereof, so as to leave the pile cap free for the passage of fueling machinery over the pile cap. In these known reactors each winding means winds up and down a single cable which passes through its own separate hole or standpipe in the pile cap and which has a control rod or flexible control element suspended from it.

According to this invention, in a reactor of the said kind, the drive means are mounted on the pile cap itself, the fueling apparatus being mounted within the pressure vessel so as to make it no longer necessary to leave the pile cap free; in addition, the or each winding means has a plurality of said cables suspended from it and passing through a common standpipe, below which the cables each pass through a separate one of a group of fixed guide tubes. Each of these guide tubes has its upper end communicating with the common standpipe and its lower end with a corresponding said control-element channel in the core. Thus when the drive means operates, all the control elements are moved simultaneously.

One nuclear reactor in a preferred form according to the invention will now be described by way of example and with reference to the accompanying drawings, of which:

FIGS. 4, 5 and 6 are elevations of parts of three alternative kinds of reactivity control element for use in the reactor in conjunction with the reactivity control apparatus.

Figure 1:
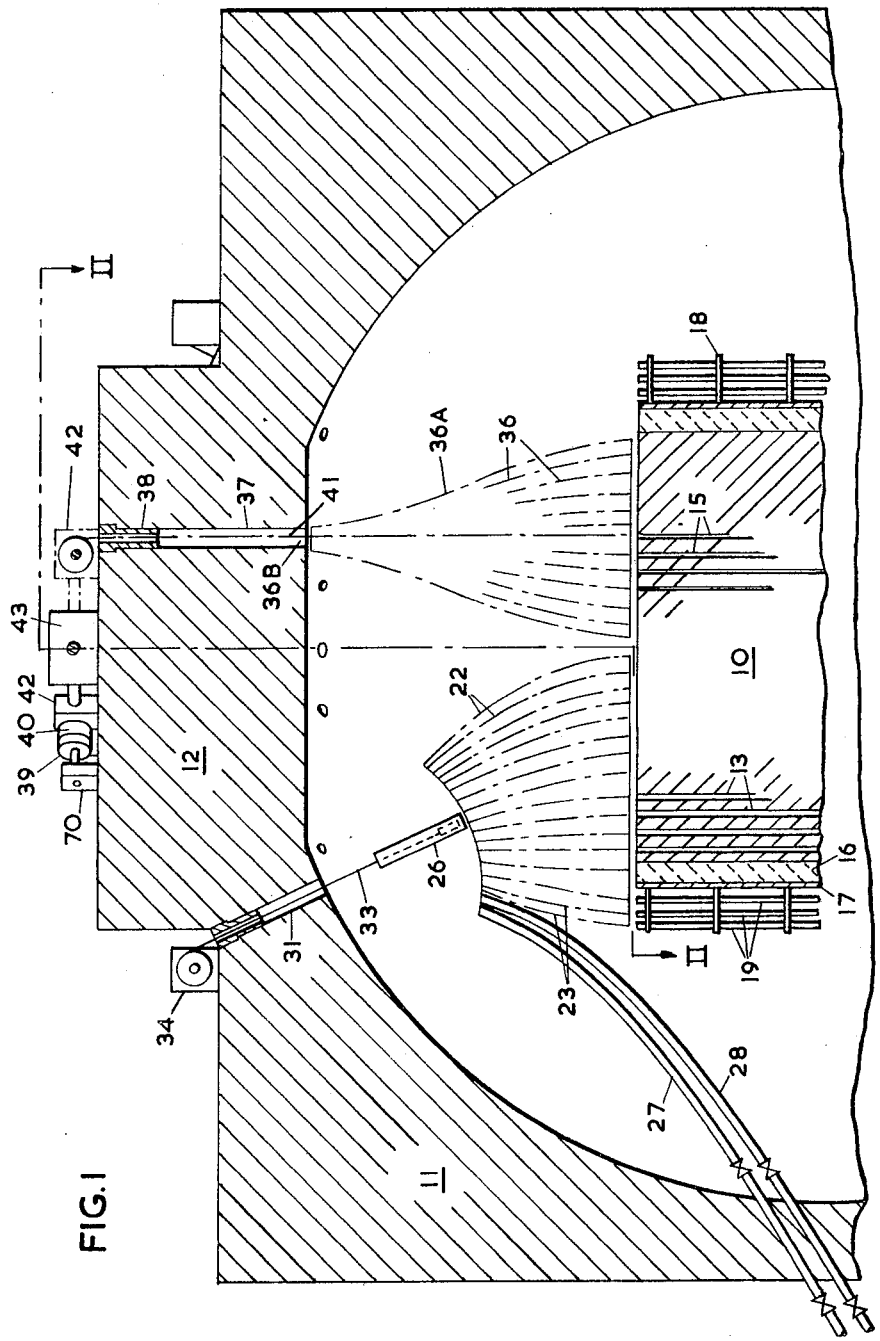
FIG. 1 is a diagrammatic sectional elevation, taken on the line I—I of FIG. 2 and showing the upper part of a pressure vessel and moderator core forming part of the reactor, together with some associated fueling and reactivity control apparatus.
Figure 2:
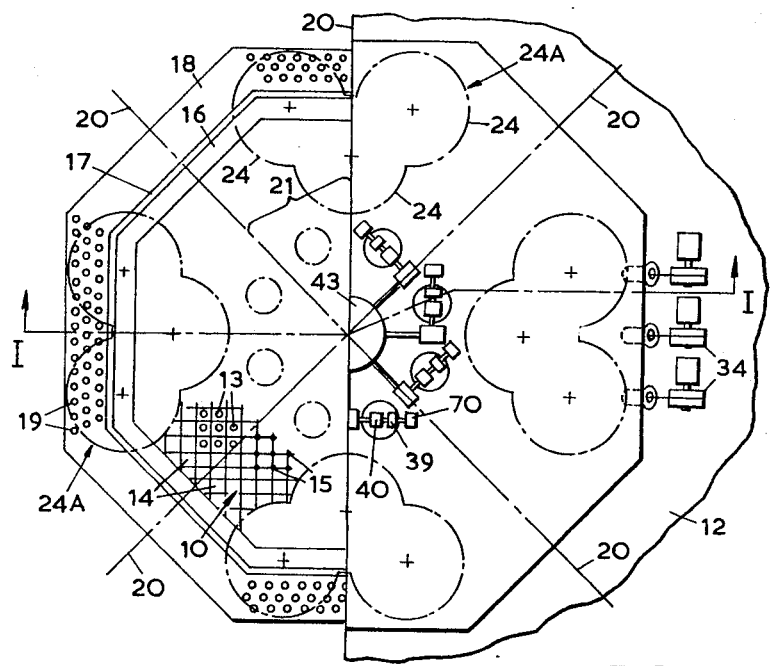
FIG. 2 is a diagrammatic sectional plan view taken on the line II—II of FIG. 1, with some of the said associated apparatus omitted for clarity.

The reactor in this example is the same as that described and claimed in United States patent application Ser No. 453,311, filed on May 5, 1965, by Everett Long, now abandoned. With reference firstly to FIGS. 1 and 2, the reactor includes a graphite moderator core 10, octagonal in plan and mounted vertically within a closed concrete pressure vessel 11 of generally-spherical internal shape and surmounted by a flat concrete pile cap 12.

In the core 10 there are a number of parallel vertical fuel channels 13 arranged according to a square lattice indicated at 14 in FIG. 2, and a number of parallel vertical equally-spaced control element channels 15 for reactivity control elements, each channel 15 being arranged approximately equidistantly between four fuel channels 13. The fuel channels 13 and control element channels 15 extend over the whole height of the core 10. Only a few channels 13 and 15 are shown in FIGS. 1 and 2.

Surrounding the moderator core 10 is a graphite reflector wall 16 within a steel shield 17, which in turn is surrounded by an open frame work 18 supporting three rows of vertical dry store tubes 19 for housing new and spent fuel elements (not shown): the dry store tubes 19 surround, and extend over substantially the whole height of, the core 10.

When the reactor is operating, fuel elements (not shown) in the fuel channels 13 are cooled by the circulation of a coolant gas through the core and thence through heat exchangers for generating steam to drive a turbo-generator. The heat exchangers and their associated gas ducts, turbines, means for circulating the gas, and so on are not shown in the drawings as they are not essential to an understanding of the invention.

Figure 3:
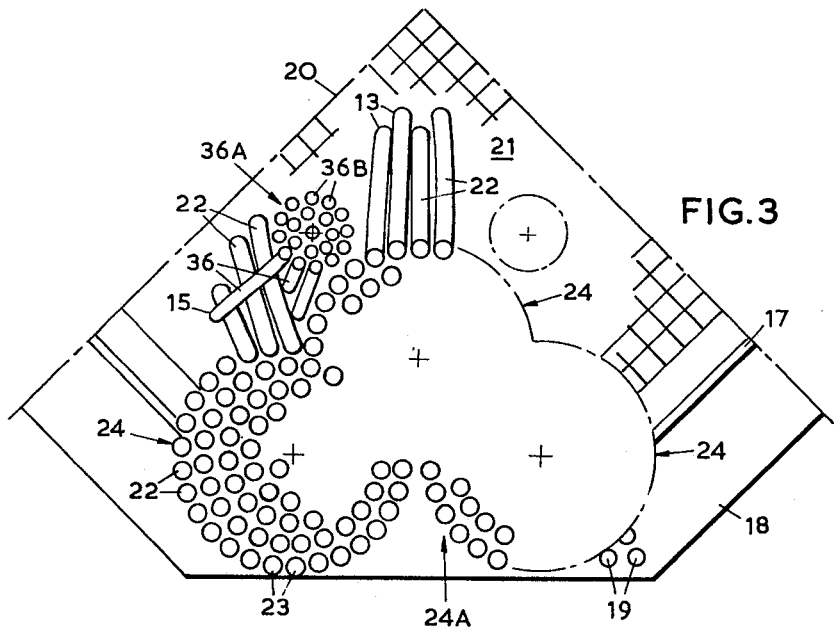
FIG. 3 is an enlargement of part of FIG. 2, showing in greater detail some of the fueling and reactivity control apparatus.

It is convenient to consider the core 10 as being divided by eight vertical planes (indicated at 20 in FIG. 2) into four pairs of equal segments 21. One pair of the segments 21 is shown in FIG. 3. The total numbers of fuel channels 13 and control element channels 15 in the reactor in this example are approximately 640 and 128 respectively, so that associated with each pair of segments 21 there are 160 fuel channels 13, and associated with each segment there are 16 control element channels 15.

A refuelling system, described fully in United States patent application Ser. No. 453,311, filed on May 5, 1965, by Everett Long. Briefly, the refuelling system includes a number of fixed fuel element guide tubes 22, 23, arranged so that all said guide tubes on any one pair of segments 21 (i.e., one quarter) of the core 10 form a single assembly 24A, the upper ends of the guide tubes being disposed in three groups of concentric circles, each group of concentric circles being indicated at 24 in FIG. 2. Associated with the guide tubes 22, 23 in the refuelling system are movable charge chutes 26, fuel element reception tubes 27, discharge tubes 28, standpipes 31, grabhead cables 33 and grabhead cable winding mechanisms 34. The refuelling system is not in itself an essential part of the present invention and will therefore not be described further.

A number of control element guide tubes 36 are provided for giving access to the control element channels 15 in the core. In this example, the control element guide tubes 36 on each segment 21 of the core are arranged in a single assembly 36A, passing upwardly between the fuel element guide tubes 22 and having their top ends 36B grouped in concentric circles directly below a standpipe or marshalling hole 37 in the pile cap 12. Each standpipe 37 is provided with a gas-tight sealing plug 38, through which there pass fourteen control element operating cables wound on a single winding drum 39, and two further control element operating cables wound on a second winding drum 40. The control element operating cables are indicated diagrammatically by a single chain-dotted line at 41 in FIG. 1.

The winding drums 39, 40 over each standpipe 37 are controlled by a control element winding mechanism 42, and all the winding mechanisms 42 are operated by a single electric motor drive 43. Each control element operating cable passes down through a separate control element guide tube 36 and a flexible reactivity control element (not shown in FIGS. 1 to 3) is suspended from its lower end.

These reactivity control elements may be in any suitable form, three examples being shown in FIGS. 4 to 6. With reference firstly to FIG. 4, the element comprises a number of beads 44 which are threaded on to a cable 45 continuous with the corresponding control element operating cable. Each bead 44 consists of a steel casing 46 containing a woven glass or ceramic neutron-absorbing insert 47. The casing 46 fits on a waisted ferrule 48 attached to the cable 45.

The control element shown in FIG. 5 comprises a number of cylindrical portions 50, joined together by links 51 and again suspended from the corresponding control element operating cable. Each cylindrical portion 50 comprises a steel container 52 enclosing a neutron-absorbing sleeve 53 of woven ceramic fibre.

The control element shown in FIG. 6 consists of a number of hollow cylindrical portions 60 suspended from the cable 41, each cylindrical portion 60 comprising inner and outer steel sleeves 61 and 62 respectively and an intermediate copper sleeve 63 containing a neutron-absorbing material such as boron carbide. The ends of the cylindrical portions 60 are closed by end discs 64. The cylindrical portions 60 are coupled to each other by means of lost-motion joints consisting of two dumb-bell members 65 and 66 which are pivotally connected together by means of a pin 67. Each dumb-bell member 65, 66 is arranged to rest in a chamfered seating 64A in the appropriate end disc 64, but is free to move axially into the corresponding cylindrical portion 60.

The two control elements suspended from the cables on each winding drum 40 (FIGS. 1 to 3) are sector control elements, for adjusting local reactivity to compensate for small changes therein and for stabilising local neutron flux. Each sector control element corresponding to a particular drum 40 is therefore arranged, not only to be rotated with the main drum 39, but also so that it can be rotated independently through a small amount by a separate operating unit 70. This limited freedom of independent movement of the drum 40 may for example be achieved by providing in the shaft between the drums 39 and 40 a coupling (not shown), the driven side of which is free at all times to move a small amount (for example 180°) with respect to the driving side thereof.

The control elements, when fully withdrawn, are housed in the control element guide tube 36.

Each control element may be made so that its capacity for neutron absorption varies along its length. This is preferably achieved by varying the quantity of neutron-absorbing material from one bead 44 to another (FIG. 4), or from one cylindrical portion 50, 60 to another (FIGS. 5 and 6). In a typical example the neutron-absorbing capacity is greatest at the top end of the control element, and decreases to zero at the bottom end.

It will be seen from the foregoing that the functions of normal reactivity control, fast shutdown in emergency, xenon over-ride control and local reactivity control can if desired be combined in one control element, by suitable adjustment of the neutron-absorbing capacity along the length of the element.

The control element standpipes 37 may be located anywhere suitable on pile cap 12. In the example shown they must, however, be nearer the axis of the core than are the upper ends of the fuel element guide tubes 22. There need not be one control element standpipe 37 to each segment of the core: there might for example be one to each pair of segments, i.e., four altogether.

The control elements are not confined to the forms described herein, but may be of any suitable kind provided they can flex sufficiently in the guide tubes 36. Alternatively, straight control rods may be provided, each control rod being in one continuous length or in sections having a capacity for neutron absorption varying along its length. In such a case the control element guide tubes are straight and vertical, and the control element operating cables 41 are arranged to pass through a suitable system (such as a pulley system) from the standpipe 37 into the top ends of the guide tubes 36.

Chains may be provided instead of the cables 41, the drums 39, 40 being provided with sprockets for engaging the chains.

A reactivity control system such as that described herein, in which all the control elements are operated from a single motor unit (such as the unit 43) is not confined to use in a reactor having fuelling arrangements such as those described herein. For example such a reactivity control system may be used in a reactor arranged for fuelling from underneath.

The moderator core 10 and pressure vessel 11 may be of any suitable shape, not necessarily of the shapes described herein; the pressure vessel may for example be cylindrical, as may the core. The pressure vessel may be of steel instead of concrete.

The present invention is applicable, wholly or in part, to other kinds of nuclear reactor than gas-cooled or graphite-moderated reactors. For example, a reactivity control system such as that described herein may be used in a liquid-moderated reactor, the fuel being housed in separate tubes which are in effect extensions of the fuel element guide tubes 22. Examples of such other reactors include boiling-water, pressurised-water and steam-generating heavy water reactors; and gas-cooled and liquid-cooled liquid-moderated reactors.

Whit I claim as my invention and desire to secure by Letters Patent is:

1. A nuclear reactor comprising a closed pressure vessel the top face of which comprises a pile cap, a reactor core within said pressure vessel and having a plurality of control-element channels formed therein, drive means mounted on said pile cap, winding means operated by the drive means, a common standpipe penetrating the pile cap between the winding means and the reactor core, a plurality of fixed guide tubes above said reactor core but within the pressure vessel and below said standpipe, each said guide tube communicating at its lower end with a separate one of said control-element channels and at its upper end with said standpipe, a plurality of cables all suspended from said winding means and all passing through said standpipe and thence each through a separate said guide tube to the corresponding control-element channel, and a reactivity control-element suspended from each said cable, whereby when said drive means is operating all the said control-elements are moved simultaneously.

2. A nuclear reactor according to claim 1, comprising a plurality of said winding means, a plurality of groups of said fixed guide tubes, a plurality of said common standpipes each associated with one said group of guide tubes and with one said winding means, and a plurality of corresponding groups of said cables each having a said control element suspended therefrom, all the cables of each said group thereof passing from the corresponding winding means through the corresponding standpipe and through the respective guide tubes of the corresponding group of guide tubes.

3. A nuclear reactor according to claim 2, wherein all the said winding means are operated by a single common said drive means.

References Cited

FOREIGN PATENTS 618,121   4/1961   Canada.
1,135,583   8/1962   Germany.

OTHER REFERENCES

Schultz: Control of Nuclear Reactors and Power Plants, 1955, p. 99.

CARL D. QUARFORTH, *Primary Examiner.*

L. DEWAYNE RUTLEDGE, *Examiner.*

H. E. BEHREND, *Assistant Examiner.*